United States Patent
Durrant et al.

(10) Patent No.: US 9,726,832 B2
(45) Date of Patent: Aug. 8, 2017

(54) SECURE SC OPTICAL FIBER CONNECTOR AND REMOVAL TOOLS

(71) Applicant: Advanced Fiber Products, LLC, Des Plaines, IL (US)

(72) Inventors: Richard C. E. Durrant, Crystal Lake, IL (US); Darren J. M. Adams, Haverhill (GB)

(73) Assignee: Optical Fiber Packaging Corp., Crystal Lake, IL (US)

( * ) Notice: Subject to any disclaimer, the term of this patent is extended or adjusted under 35 U.S.C. 154(b) by 560 days.

(21) Appl. No.: 14/248,246

(22) Filed: Apr. 8, 2014

(65) Prior Publication Data

US 2016/0299299 A1      Oct. 13, 2016

Related U.S. Application Data

(60) Provisional application No. 61/809,872, filed on Apr. 8, 2013.

(51) Int. Cl.
    *G02B 6/38*      (2006.01)
(52) U.S. Cl.
    CPC ......... *G02B 6/3893* (2013.01); *G02B 6/3887* (2013.01); *G02B 6/3897* (2013.01); *G02B 6/3898* (2013.01)
(58) Field of Classification Search
    CPC ... G02B 6/3893; G02B 6/3887; G02B 6/3898
    USPC ..................................... 385/78–86
    See application file for complete search history.

(56) References Cited

U.S. PATENT DOCUMENTS

| 4,526,431 | A | * | 7/1985 | Kasukawa | G02B 6/3877 |
| | | | | | 439/153 |
| 5,212,752 | A | * | 5/1993 | Stephenson | G02B 6/3831 |
| | | | | | 385/139 |
| 5,579,425 | A | | 11/1996 | Lampert | |
| 6,357,934 | B1 | | 3/2002 | Driscoll | |
| 7,695,197 | B2 | * | 4/2010 | Gurreri | G02B 6/3887 |
| | | | | | 385/69 |
| 7,892,012 | B1 | | 2/2011 | Foung | |
| 8,287,191 | B2 | * | 10/2012 | Nielson | H01R 13/639 |
| | | | | | 385/69 |
| 8,515,228 | B2 | * | 8/2013 | Rozitis | G02B 6/32 |
| | | | | | 385/52 |
| 9,231,387 | B2 | * | 1/2016 | Benner | H02G 1/14 |
| 9,261,653 | B2 | * | 2/2016 | Isenhour | G02B 6/3807 |

(Continued)

FOREIGN PATENT DOCUMENTS

GB     2486258 A     6/2012

OTHER PUBLICATIONS

PCT International Search Report for application No. PCT/US2014/033399 mailed Aug. 11, 2014.

*Primary Examiner* — Ellen Kim
(74) *Attorney, Agent, or Firm* — Chicago IP Law; Steven M. Evans

(57) ABSTRACT

An optical plug having an anti-snag guide to prevent the plug from being caught on corners and edges when an attached cable is being pulled around corners and edges during installation and removal of the optical plug. The optical plug includes a unique arrangement of different width apertures corresponding to a removal tool having corresponding different width prongs to be received by the apertures to release the optical plug from an optical receptacle.

20 Claims, 14 Drawing Sheets

(56) References Cited

U.S. PATENT DOCUMENTS

| | | | |
|---|---|---|---|
| 2001/0026661 A1* | 10/2001 | de Jong | G02B 6/3831 385/56 |
| 2004/0101265 A1* | 5/2004 | Jong | G02B 6/3807 385/134 |
| 2007/0207667 A1 | 9/2007 | Caveney | |
| 2011/0058774 A1* | 3/2011 | Gurreri | G02B 6/3831 385/78 |
| 2011/0274437 A1* | 11/2011 | Jones | G02B 6/3895 398/141 |
| 2011/0286702 A1 | 11/2011 | Nielson | |
| 2011/0317976 A1 | 12/2011 | Eckstein | |
| 2012/0033922 A1* | 2/2012 | Nakagawa | G02B 6/3879 385/78 |
| 2012/0082416 A1* | 4/2012 | Katoh | G02B 6/3831 385/72 |
| 2013/0028569 A1* | 1/2013 | Kempeneers | G02B 6/4471 385/139 |
| 2014/0161407 A1* | 6/2014 | Lee | G02B 6/3849 385/134 |

\* cited by examiner

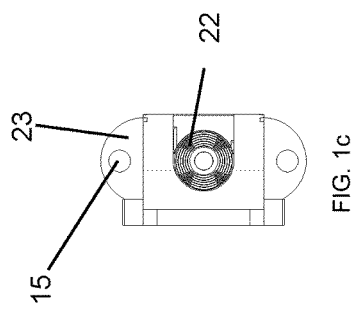
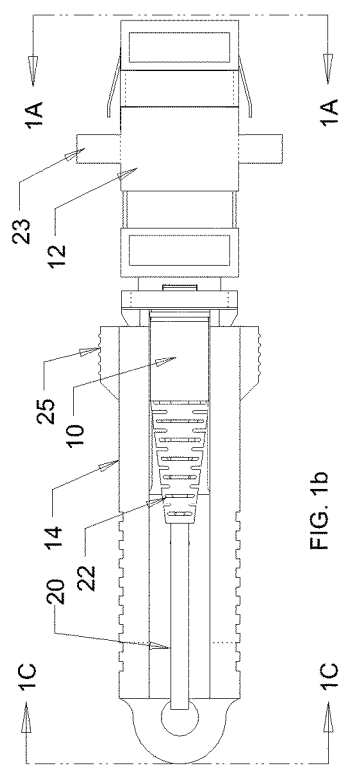
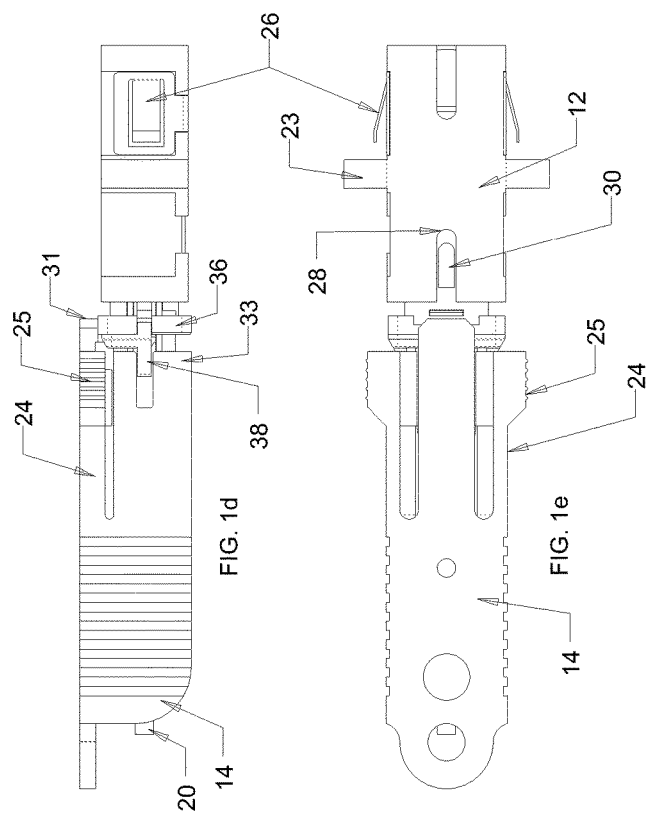
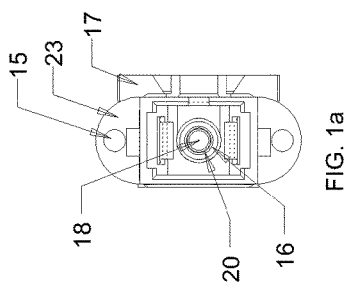

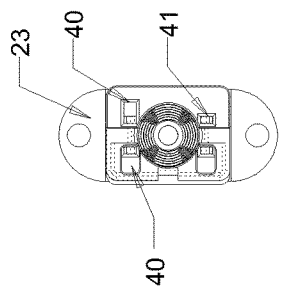
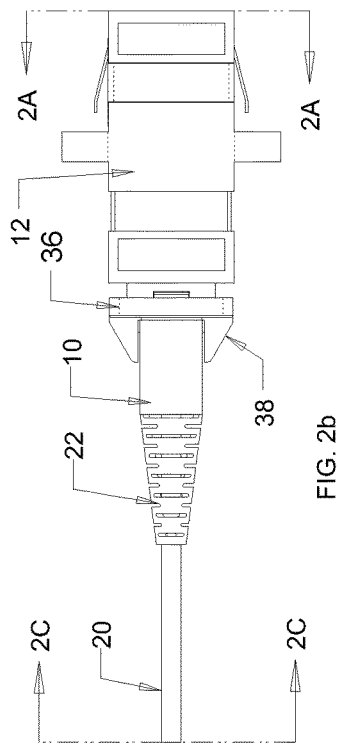
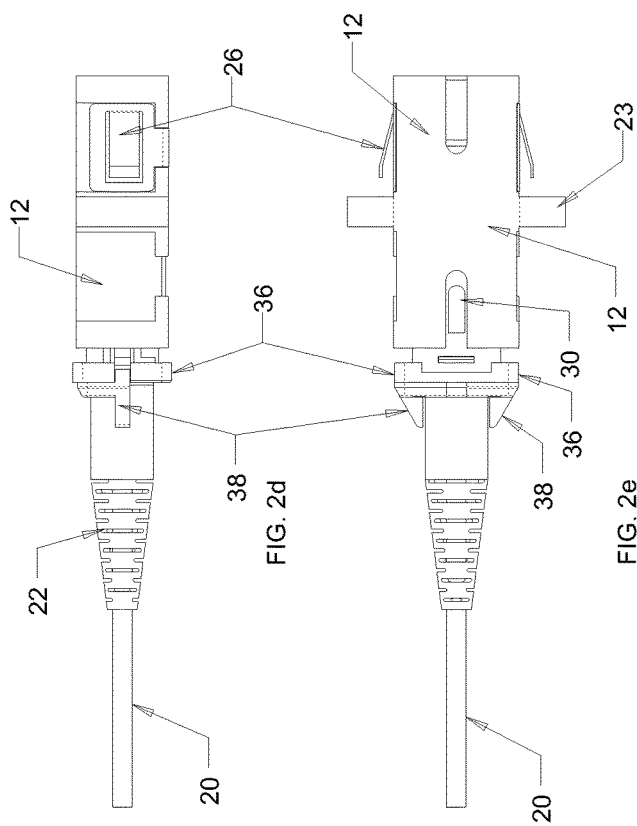
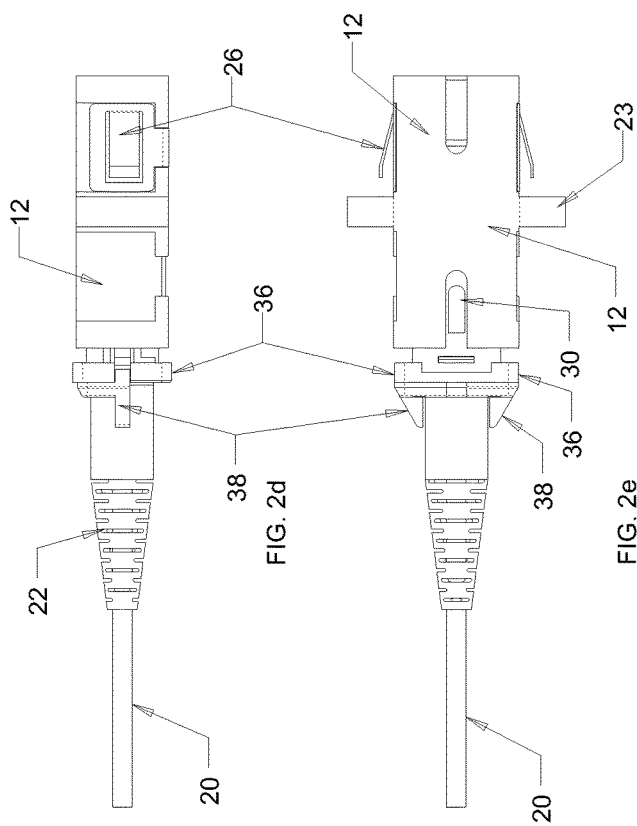
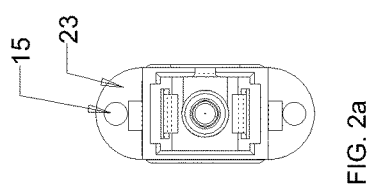

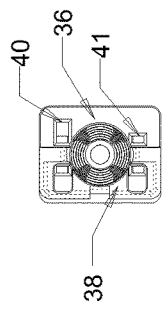
FIG. 3a
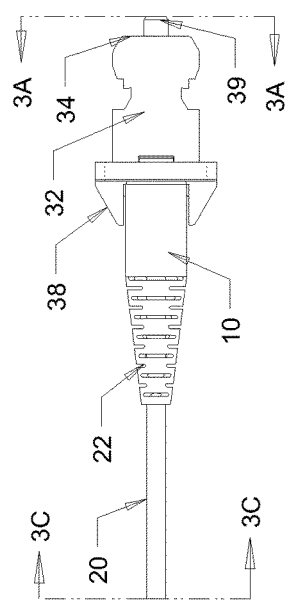
FIG. 3b
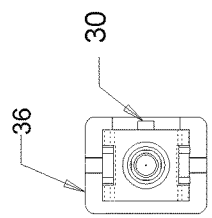
FIG. 3c
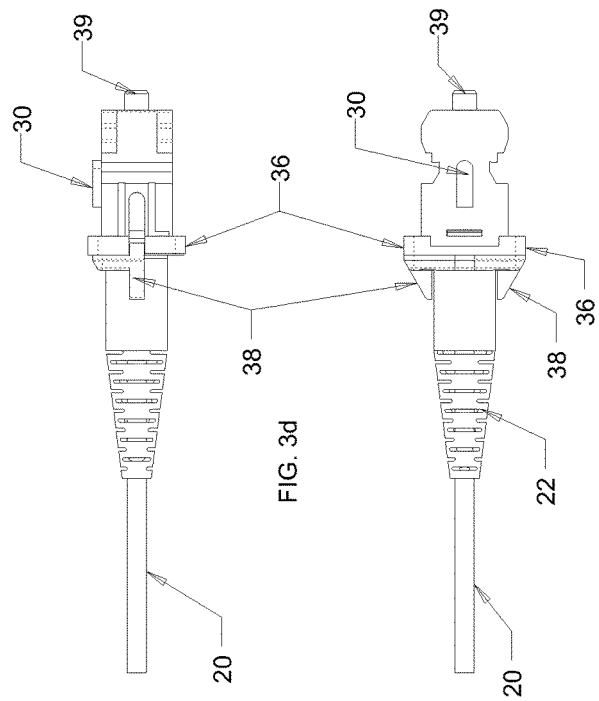
FIG. 3d
FIG. 3e

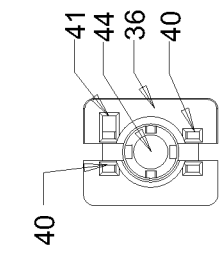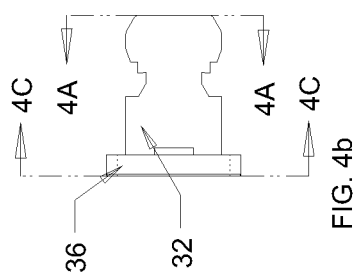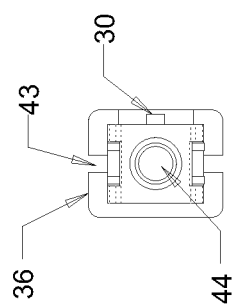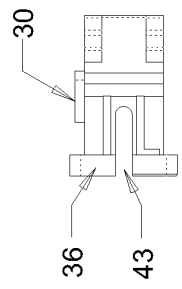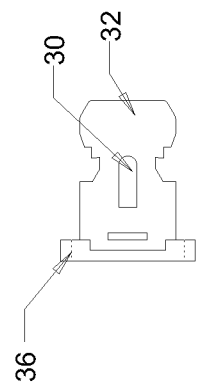
FIG. 4a
FIG. 4b
FIG. 4c
FIG. 4d
FIG. 4e

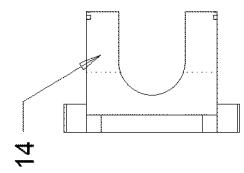
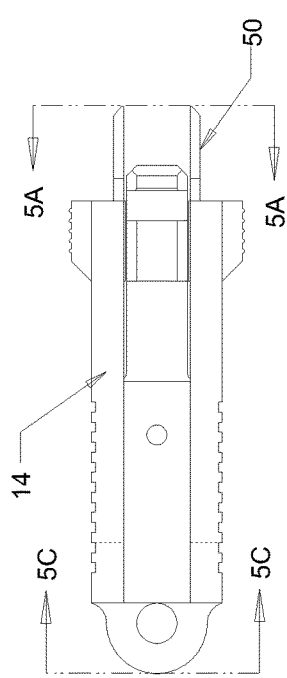
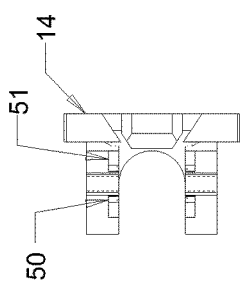
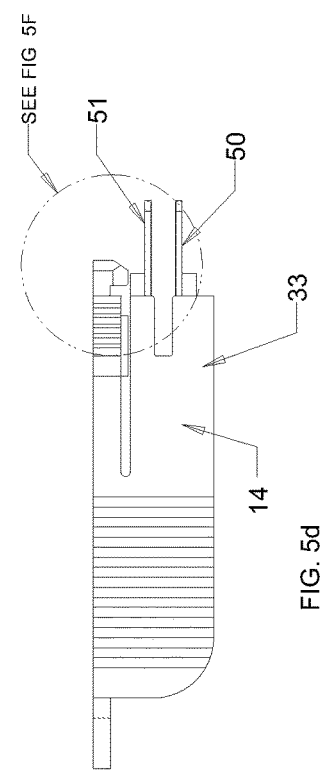
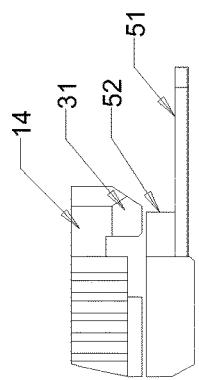
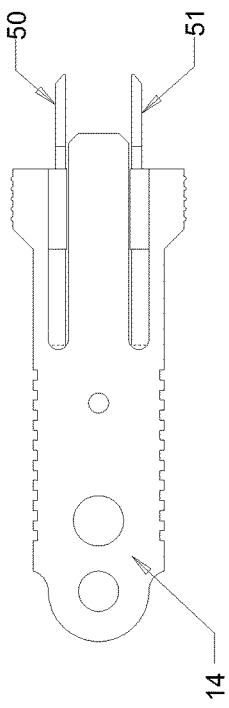
FIG. 5a
FIG. 5b
FIG. 5c
FIG. 5d
FIG. 5e
FIG. 5F

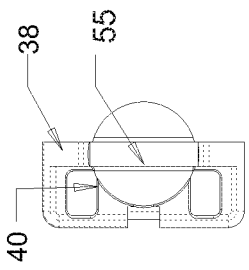
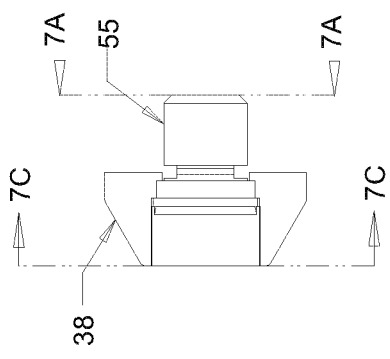
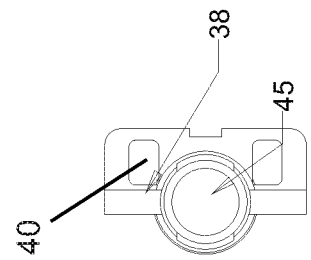
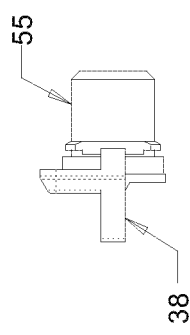
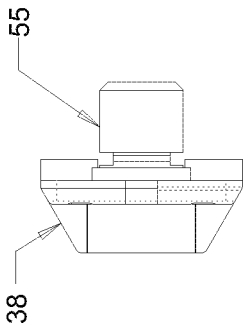
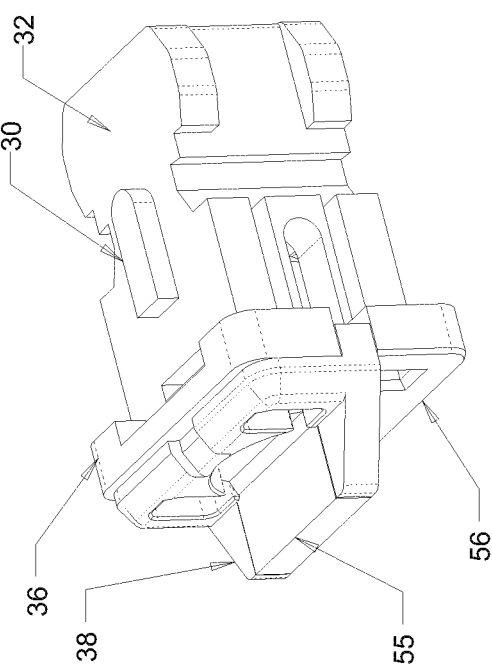

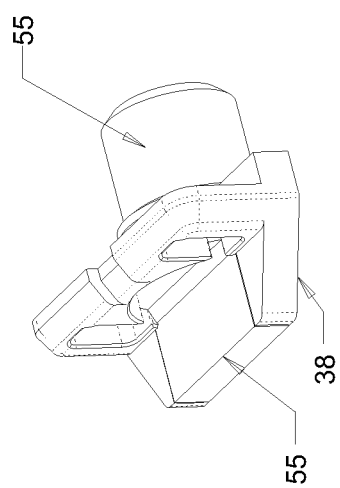

SECURE SC OPTICAL FIBER CONNECTOR AND REMOVAL TOOLS

CROSS-REFERENCE TO RELATED APPLICATION

This non-provisional application claims priority and benefit of provisional application having Ser. No. 61/809,872, filed Apr. 8, 2013, entitled "Secure SC Optical Fiber Connector and Removal Tools," which is hereby incorporated by reference.

BACKGROUND OF THE INVENTION

Field of the Invention

The present invention relates generally to optical connectors, and more particularly, to secure SC type fiber optic connectors that can only be disconnected with specific removal tools.

Background of the Invention

Optical connectors are commonly used in both civilian and military applications. In both of these applications, security is an issue. Not only is it important to properly connect the correct optical plug with the correct corresponding optical receptacle, it is important to prevent a connected optical plug from being removed by an unauthorized user, and further, it is important to prevent an optical connector port from being accessed by an unauthorized user.

Additionally, it is very common for optical plugs to get caught or snagged on surrounding optical cables, other optical plugs, and edges and corners of cable trays, conduits and the like when optical cables having optical plugs are being installed or removed.

Accordingly, there is a need to provide an optical plug and optical receptacle that facilitates optical plugs being connected to correct corresponding optical receptacles. Furthermore, there also is a need to provide an optical plug that cannot be disconnected by unauthorized user. Moreover, there is a need for an optical plug that does not get caught and snagged when the attached optical cable is being pulled around edges and corners during installation or on retrieval.

ASPECTS AND SUMMARY OF THE PRESENT INVENTION

One aspect of the present invention is to provide an optical plug that includes an anti-snag guide to prevent the optical plug or connector from being caught on corners and edges when the attached cable is being pulled around corners and edges during installation and removal.

Another aspect of the present invention is to provide optical plugs or connectors that can only be disconnected with specific removal tools. The optical connectors or plugs have different color coded features on the connector body, such as an anti-snag feature, to indicate their keyway, and only a removal tool having the same color and matched keyway can unlock and remove an optical plug having the same color anti-snag guide.

The present invention provides an unlocking and release tool for an optical fiber SC connector. A standard SC connector typically has an outer shroud that pulls or slides back to release the latch arms in the coupling adaptor/receptacle to release the plug. It's a push-pull design with an inner body component and a sliding outer release shroud. The present invention is a single body that eliminates the outer shroud that an operator normally pulls back. Additionally, the present invention is designed to restrict physical access, tampering, or insertion of any objects or unauthorized tools to force de-latching. Accordingly, when an SC connector is plugged in, there is no direct access to lift the latch arms in the adaptor to disconnect it.

The present invention enables the optical plug to be unlocked and removed by providing multiple apertures passing through the back plate shield of the optical plug, allowing corresponding matching prongs, wherein at least one prong is a different width or shape, of the release tool to protrude under the latch arms when inserted. The design is compatible with industry standard SC interfaces.

In order to achieve these aspects, the present invention provides an optical connector having an optical fiber plug with a front and a back and a plurality of apertures on the back of the optical plug having similar configurations. An aperture on the back of the optical plug has a different configuration from the plurality of apertures. A removal tool is provided having a plurality of prongs having a cross-sectional configuration corresponding to the plurality of apertures on the back of the optical plug, and the removal tool includes a unique prong having a different cross-sectional configuration corresponding to the aperture having a different configuration. A ramp is included on the rear of the optical fiber plug to function as an anti-snag guide and to identify the mechanical key configuration of the specific connector plug.

Protrusions on the removal tool are also provided to interface with the mechanical features of the key way indicating anti snag component to ensure the correct orientation of the keyed removal tool to allow its insertion into the rear of the connector.

The foregoing, as outlined rather broadly, the preferred features of the present invention so that those skilled in the art may better understand the detailed description of the invention that follows. Additional features of the invention will be described hereinafter that form the subject of the claims of the invention. Those skilled in the art should appreciate that they can readily use the disclosed invention and specific embodiments as a basis for designing or modifying other structures for carrying out the same purposes of the present invention, and that such other structures do not depart from the spirit and scope of the invention in its broadest form.

BRIEF DESCRIPTION OF THE DRAWINGS

FIGS. 1a-e illustrate multiple views of an optical plug, optical receptacle, and removal tool configured in accordance with the present invention;

FIGS. 2a-e illustrate multiple views of an optical plug and optical receptacle configured in accordance with the present invention;

FIGS. 3a-e illustrate multiple views of an optical plug configured in accordance with the present invention;

FIGS. 4a-e illustrate multiple views of a front end of a optical plug configured in accordance with the present invention;

FIGS. 5a-f illustrate multiple views of a removal tool configured in accordance with the present invention;

FIGS. 7a-f illustrate multiple views of a bung, anti-snag guide, and optical plug, wherein the bung is blocking a fiber cable aperture opening in the plug body in accordance with the present invention;

FIG. 14 illustrates a perspective view of a bung located within a fiber cable aperture of the anti-snag guide in accordance with the present invention.

DETAILED DESCRIPTION OF THE PREFERRED EMBODIMENT

Figure 6C:
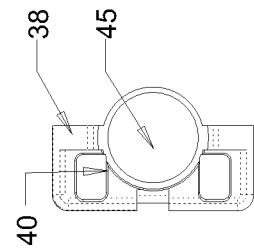
FIGS. 6a-e illustrate multiple views of an anti-snag guide for an optical plug configured in accordance with the present invention.

Referring now to the drawings, FIGS. 1a-e illustrate various view of a secure SC optical plug or connector 10, an optical receptacle 12, and a removal tool 14 configured in accordance with a preferred embodiment of the present invention. The optical receptacle 12 is configured to include an optical port. The optical receptacle 12 also is referred to as an adapter or a coupling adapter. The optical connector or optical plug 10 is shown connected to or coupled within the optical receptacle 12. The removal tool 14 is shown being inserted into apertures within the optical plug 10 in order to release the optical plug 10 from an optical port to be located within the optical receptacle 12. The optical plug 10, optical receptacle 12, and removal tool 14 all are preferably formed from a polymer, such as plastic. Prongs of the removal tool 14, however, are preferably constructed of metal, such as steel.

FIG. 1a is an end view of the optical receptacle 12 taken along line 1a-1a of FIG. 1b. FIG. 1a shows an end of an optical fiber cable 20 encasing an optical ferrule 16 and an optical fiber 18, wherein the optical fiber cable 20 extends within the optical plug 10. Also illustrated in FIG. 1a is a top 17 of the removal tool 14. The optical receptacle 12 includes mounting apertures 15 on extensions 23 of the optical receptacle 12 for inserting a bolt or screw for mounting the optical receptacle 12.

FIG. 1b is a bottom view of the optical plug 10, the optical receptacle 12, and the removal tool 14. The optical fiber cable 20 surrounding the optical fiber 18 and a boot 22 surrounding the optical fiber cable 20 adjacent to the optical plug 10 also are illustrated. Compression tabs 25 of flexible release legs 24 of the removal tool 14 are shown. Securing wings 26 on sides of the optical receptacle 12 are included for securing the optical receptacle 12 within a port or aperture.

FIG. 1c is an end view of the optical fiber cable 20, the boot 22, the optical receptacle 12, and the removal tool 14 taken along line 1c-1c shown in FIG. 1b. The mounting apertures 15 on the optical receptacle 12 also can be seen.

FIG. 1d is a side view of the optical plug 10, the optical receptacle 12, and the removal tool 14 shown in FIG. 1b. The flexible release legs 24 of the removal tool 14 are shown, as is the securing wings 26 on the optical receptacle 12. The optical fiber cable 20 is shown extending out the rear end of the removal tool 14.

FIG. 1e is a top view of the optical plug 10, the optical receptacle 12, and the removal tool 14. The flexible release legs 24 and compression tabs 25 of the removal tool 14 are shown. Also illustrated is a guide slot 28 in the optical receptacle 12 for receiving a guide bar 30 on the optical plug 10 for properly positioning the optical plug 10 within the optical receptacle 12.

FIGS. 2a-e illustrate the optical plug 10 connected within the optical receptacle 12. The removal tool 14 shown in FIGS. 1b, 1d, and 1e is not shown in FIGS. 2a-e in order to better illustrate the optical plug 10 and e optical receptacle 12. FIG. 2a is a front view of the optical receptacle 12 shown in and taken along line 2a-2a of FIG. 2b. FIG. 2b is a bottom view of the optical plug 10 and the optical receptacle 12. FIG. 2c is a rear view of the optical plug 10 shown in and taken along line 2c-2c of FIG. 2b. 2d is a side view of the optical plug 10 and the optical receptacle 12 shown in FIG. 2b. FIG. 2e is a top view of the optical plug 10 and the optical receptacle 12 shown in FIG. 2b.

The optical fiber cable 20 is shown extending from the boot 22 of the optical plug 10. The optical plug 10 includes a body 32 (FIG. 3b) having a front 34 (FIG. 3b) and a back plate 36. An anti-snag guide 38 forms an inclined ramp extending between the boot 22 and the back plate 36 to prevent the optical plug 10 from getting caught on corners, edges, and other cables when the optical plug 10 is pulled by the optical cable 20 during installation or removal. The boot 22 is connected to the connector body 32, and the boot 22 encloses the optical cable 20 which extends from the boot 22.

In accordance with the present invention, FIG. 2c illustrates apertures 40 in the back plate 36 of the optical plug 10 for receiving prongs 50 (FIG. 5b) of the removal tool 14. The prongs 50 are preferably constructed of metal, such as steel. Prongs 50 of the removal tool 14 are inserted into the apertures 40 in order to release the optical plug 10 from the optical receptacle 12. Further in accordance with the present invention, at least one of the apertures 40, here aperture 41, is sized differently than the other apertures 40 in order to provide a unique keyed configuration. Accordingly, only a removal tool 14 having prongs 50 matching the size configuration of the apertures 40 on the optical plug 10 will be able to be inserted into the corresponding apertures 40 and release the optical plug 10 from the optical receptacle 12. Additionally, a removal tool 14 corresponding to a corresponding optical receptacle 12 having a matching configuration of apertures 40 will be color coded to have the same color as the back plate 36 or anti-snag guide 38 of the optical receptacle 12 in order to color code the correct removal tool 14 with the correctly keyed optical plug 10.

FIGS. 3a-e illustrate the optical plug 10 shown in FIGS. 1b, 1d, 1e, 2b, 2d, and 2e. The optical receptacle 12 and the removal tool 14 are not illustrated in order to provide a clearer illustration of the optical plug 10. FIG. 3a is a front view of the optical plug 10 shown in and taken along ling 3a-3a of FIG. 3b. FIG. 3b is a bottom view of the optical plug 10. FIG. 3c is a rear view of the optical plug shown in and taken alone line 3c-3c in FIG. 3b. FIG. 3d is a side view of the optical plug 10 shown in FIG. 3b. FIG. 3e is a side view of the optical plug 10 shown in FIG. 3b.

FIGS. 4a-e illustrate multiple views of a body 32 of the optical plug 10 shown in FIG. 3b. The optical fiber cable 20, and boot 22, and anti-snag guide 32 have been removed to more clearly illustrate the body 32. FIG. 4a is a front view of the body 32 shown in and taken line 4a-4a f FIG. 4b. FIG. 4b is a bottom view of the body 32. FIG. 4c is a rear view of the body 32 shown in and taken along line 4c-4c of FIG.

4b. FIG. 4d is a side view of the body 32 shown in FIG. 4b. FIG. 4e is a top view of the body 32 shown in FIG. 4b.

FIGS. 4a and 4c show a ferrule aperture 44 for receiving an optical ferrule 39 through the back plate 36 and body 32. The guide bar 30 is shown in FIG. 4e. Slots 43 are shown in FIG. 4d for receiving and the anti-snag guides 38. FIG. 4c illustrates apertures 40 in the back plate 36 for receiving the prongs 50 of the removal tool 14. Note that aperture 41 has a different size and configuration than apertures 40 in order to function as a unique key. The position of the apertures 40 and 41 can be changed to create additional lock combinations, requiring a different removal tool 14 with the correct matching prongs 50. Furthermore, the apertures 40 and 41 can be different in number, such as 2, 3, 4, 5, or 6, and different shapes, such as round, square, rectangle, star, or triangle.

FIGS. 5a-f illustrates the removal tool 14 having a plurality of prongs 50 with similar widths and heights that correspond with the apertures 40 in the optical plug 10 having similar widths and heights, and a single prong 51 having a larger height portion 52 that corresponds to aperture 41 having a larger height. The optical plug 10 and optical receptacle 12 are not shown to provide a clearer view of the removal tool 14. FIG. 5a is a front view of removal tool 14 shown in and taken along line 5a-5a of FIG. 5b. FIG. 5b is a bottom view of the removal tool 14 shown in FIGS. 2b and 3b. FIG. 5c is an end view of the removal tool 14 shown in and taken along line 5c-5c of FIG. 5b. FIG. 5d is a side view of the removal tool 14 shown in FIG. 5b, and FIG. 5e is a top view of the removal tool 14 shown in FIG. 5b. FIG. 5f is an enlarged view of the prong 51 shown in FIGS. 5d and 5e.

The larger height portion 52 on the prong 51 fits into the larger or taller aperture 41. The prongs 50 and 51 are preferably constructed of a metal, such as steel. The pattern of smaller 40 and larger 41 height or width apertures corresponding to smaller and larger height or width prongs 50 and 51 on the removal tool 14 to provide a unique lock and key combination. FIG. 5f is an enlarged view of prong 51 shown in FIG. 5e.

Similar to the apertures 40 and 41, the prongs 50 and 51 can be different in number, such as 2, 3, 4, 5, or 6, and different shapes, such as round, square, rectangle, star, or triangle. A corresponding removal tool 14 and plug body feature 32, such as the anti-snag guide 38, have similar colors to identify they are pairs and matching. The pattern of different width apertures and prongs can be changed for different color plug 10 and removal tool 14 combinations.

FIGS. 6a-e illustrate multiple views of the anti-snag guide 38. The anti-snag guide 38 is preferably constructed of plastic to form a ramp that is fitted onto the back plate 36 of the plug body 32. The ramp configuration of the anti-snag guide 38 helps to prevent the back plate 36 of the body 32 of the optical plug 10 from getting caught on edges and corners while the optical plug 10 is being pulled by the fiber optic cable 20 during installation or removal of the optical plug 10.

Figure 6B:
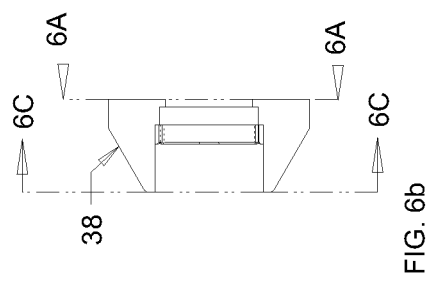
Figure 6D:
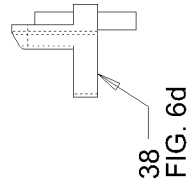
Figure 6E:
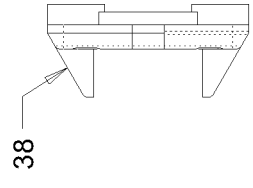
Figure 6A:
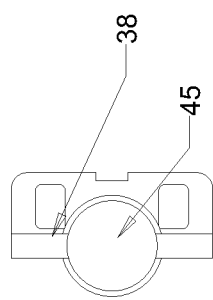

FIG. 6a is a rear view of the anti-snag guide 38 shown in and taken along line 6a-6a of FIG. 6b. FIG. 6b is a bottom view of the anti-snag guide 38. FIG. 6c is a front view of the anti-snag guide 38 shown in and taken along line 6c-6c of FIG. 6b. FIG. 6d is a side view of the anti-snag guide 38 shown in FIG. 6b. FIG. 6e is a top view of the anti-snag guide shown in FIG. 6b.

FIGS. 7a-f illustrate multiple views of a bung 55 that is fitted into the back 56 of the plug body 32 to be visible at the back of the back plate or shield plate 36 and block the ferrule aperture 44 in the plug body 32. When plugged into an optical receptacle port, the bung 55 blocks the optical port from access and can only be removed with a corresponding keyed removal or extraction tool 14. FIG. 7a is a rear view of the bung 55 and anti-snag guide 38 shown in and taken along line 7a-7a of FIG. 7b. FIG. 7b is a bottom view of the bung 55 in the anti-snag guide 38. FIG. 7c is a front view of the bung 55 and anti-snag guide 38 shown in and taken along line 7c-7c of FIG. 7b. 7d is a side view of the bung 55 and anti-snag guide 38 shown in FIG. 7b. FIG. 7e is a top view of the bung 55 and anti-snag guide 38 shown in FIG. 7b. FIG. 7f is a perspective view of the plug body 32 including the bung 55 within the ferrule aperture 45.

Figure 8:
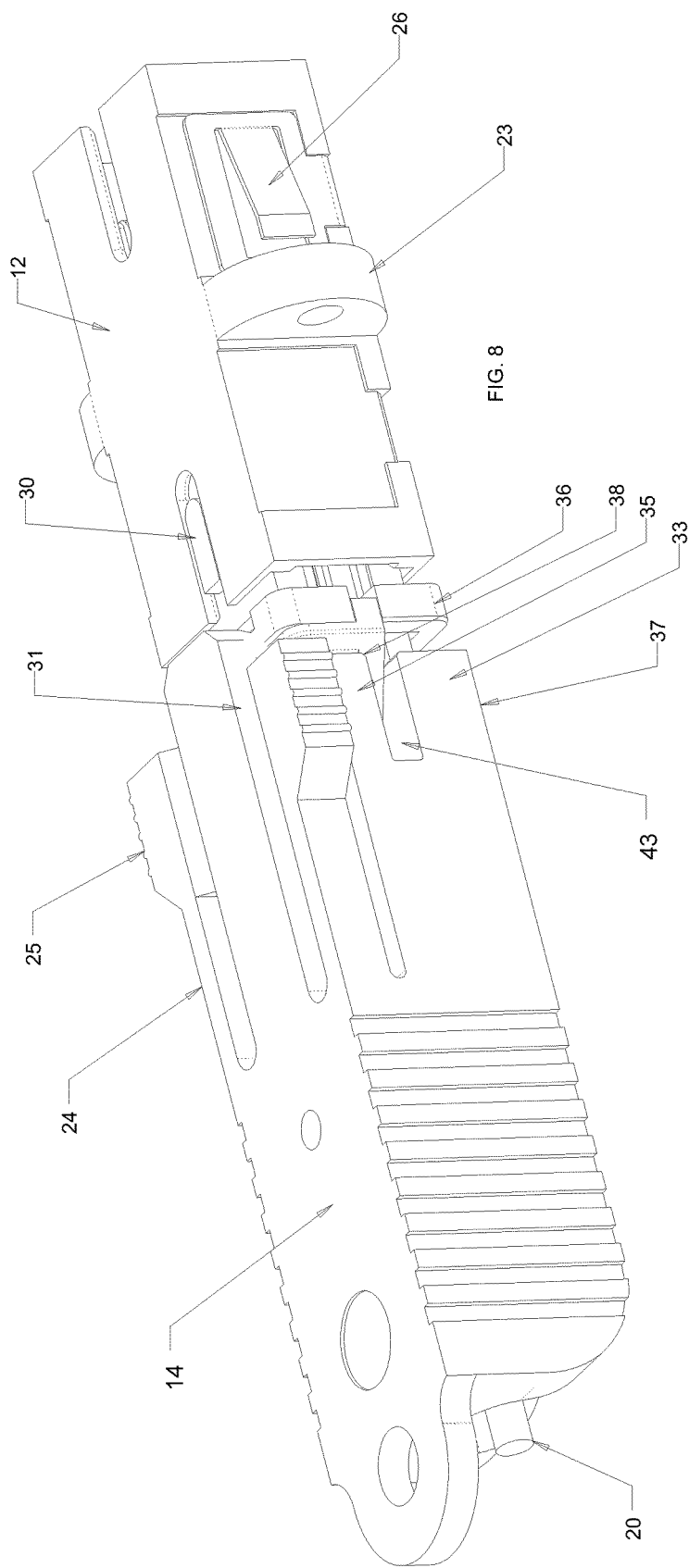
FIG. 8 illustrates a perspective view of an optical plug, optical receptacle, and removal tool configured in accordance with the present invention.

FIG. 8 illustrates a perspective view of the removal tool 14 and the optical receptacle 12. The optical plug 10 is shown within the removal tool 14 and the optical receptacle 12. A hook or clip 31 is shown on top and front end of the removal tool 14. The hook 31 is configured to grab an edge of the back plate 36 of the body 32 of the optical plug 10. The clip 31 grabbing the edge of the back plate 36 also is shown in FIG. 1b. An enlarged view of the clip 31 also is shown in FIG. 5f.

A foot extension 33 on the removal tool 14 is shown fitting below the anti-snag guide 38 and against the back plate 36 of the body 32 of the optical plug 10. The foot extension 33 extends slightly beyond an arm extension 35 on a front 37 of the removal tool 14. The arm extension 35 fits against the anti-snag guide 38, which fits on the back plate 36, and the foot extension 33 fits against the back plate 36. Since the back plate 36 is further back from the anti-snag guide 38, the different lengths of the arm extension 35 and the foot extension 33 function to property align the removal tool 14 when the removal tool 14 is being inserted into the apertures 40 and 41 of the optical plug 10. Additionally, the anti-snag guide 38 fits into the slots 43 of the body 38 of the optical plug 10 to properly position the removal tool 14 during insertion into the optical plug 10.

Figure 9:
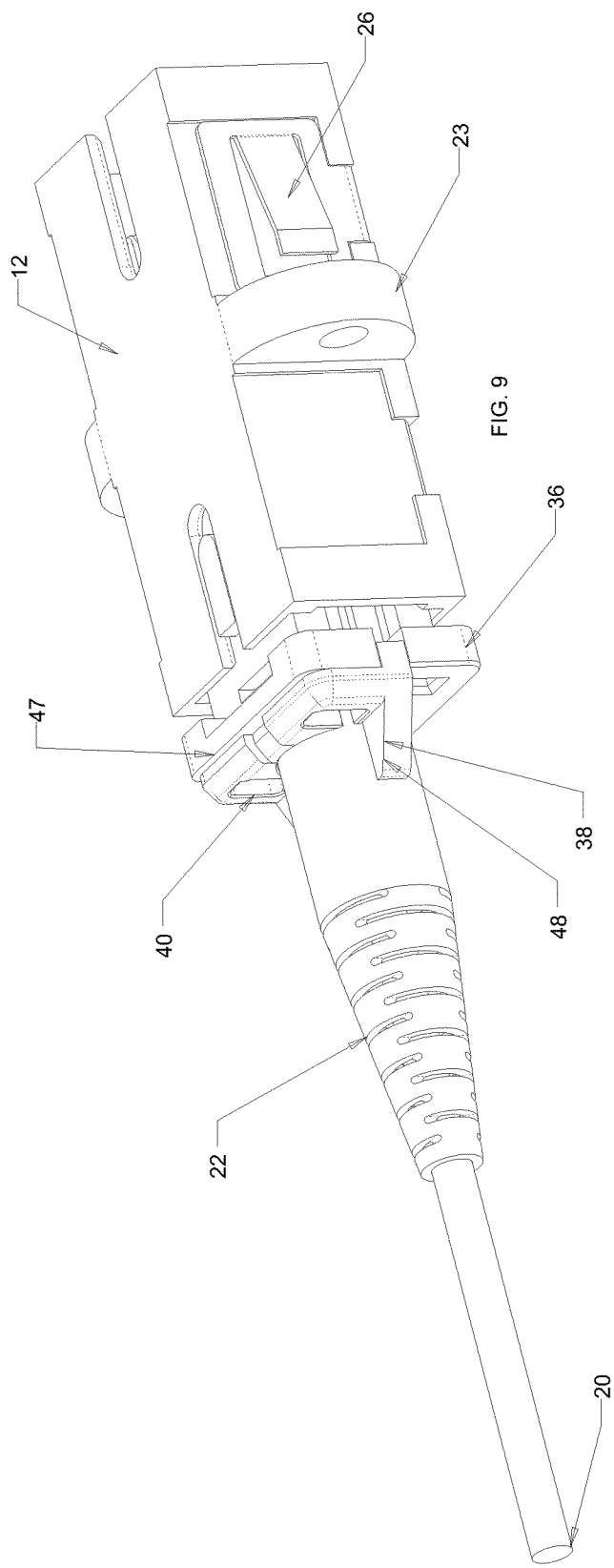
FIG. 9 illustrates a perspective view of an optical plug connected to an optical receptacle in accordance with the present invention.

FIG. 9 illustrates a perspective view of the optical plug 10 within the optical receptacle 12. The anti-snag guide 38 includes a plate 47 located on the back plate 36 of the optical plug 10. The guide plate 47 includes apertures 40 for receiving the prongs 50 of the removal tool 14. A ramp 48 extends between the boot 22 and the guide plate 47 of the anti-snag guide 38.

Figure 10:
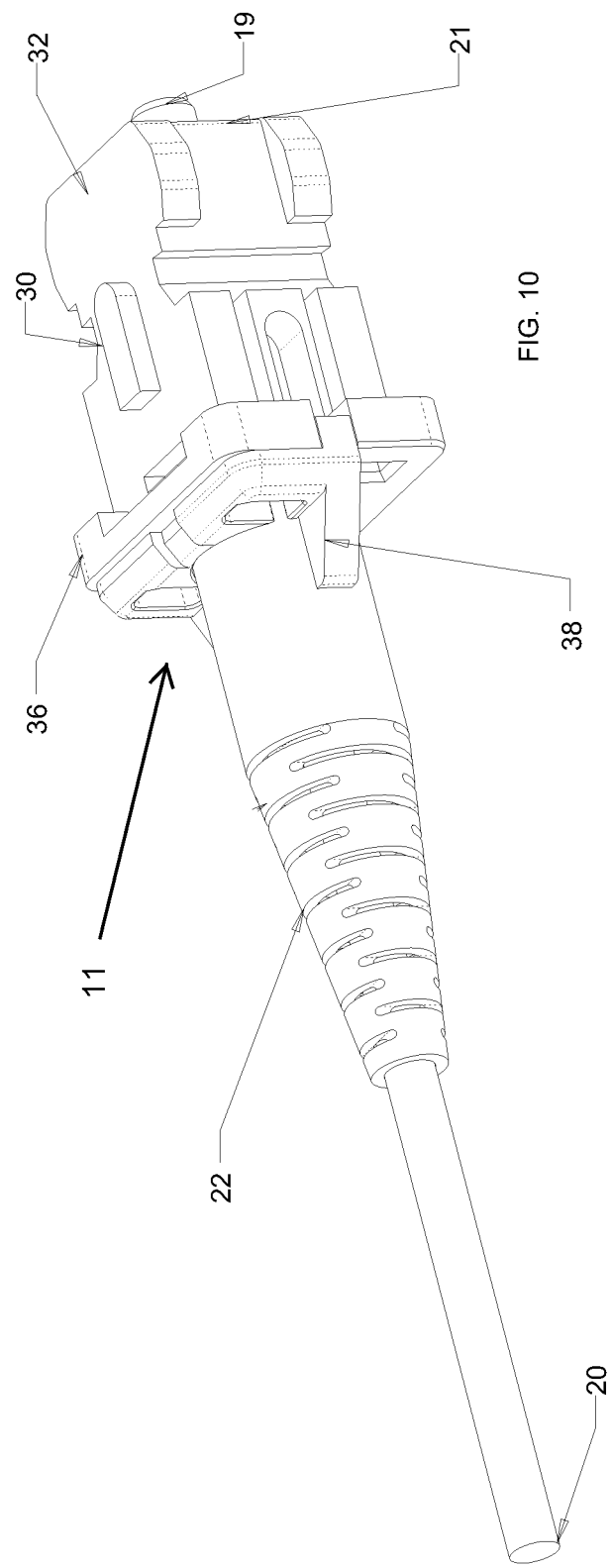
FIG. 10 illustrates a perspective view of an optical plug configured in accordance with the present invention.

FIG. 10 is a perspective view of the optical plug 10 including the plug body 32. The anti-snag guide 38 is shown in the back plate 38. The optical ferrule 19 extents out the front 21 of the optical plug 10. The fiber optic cable 20 extends out a back 11 of the optical plug 10.

Figure 11:
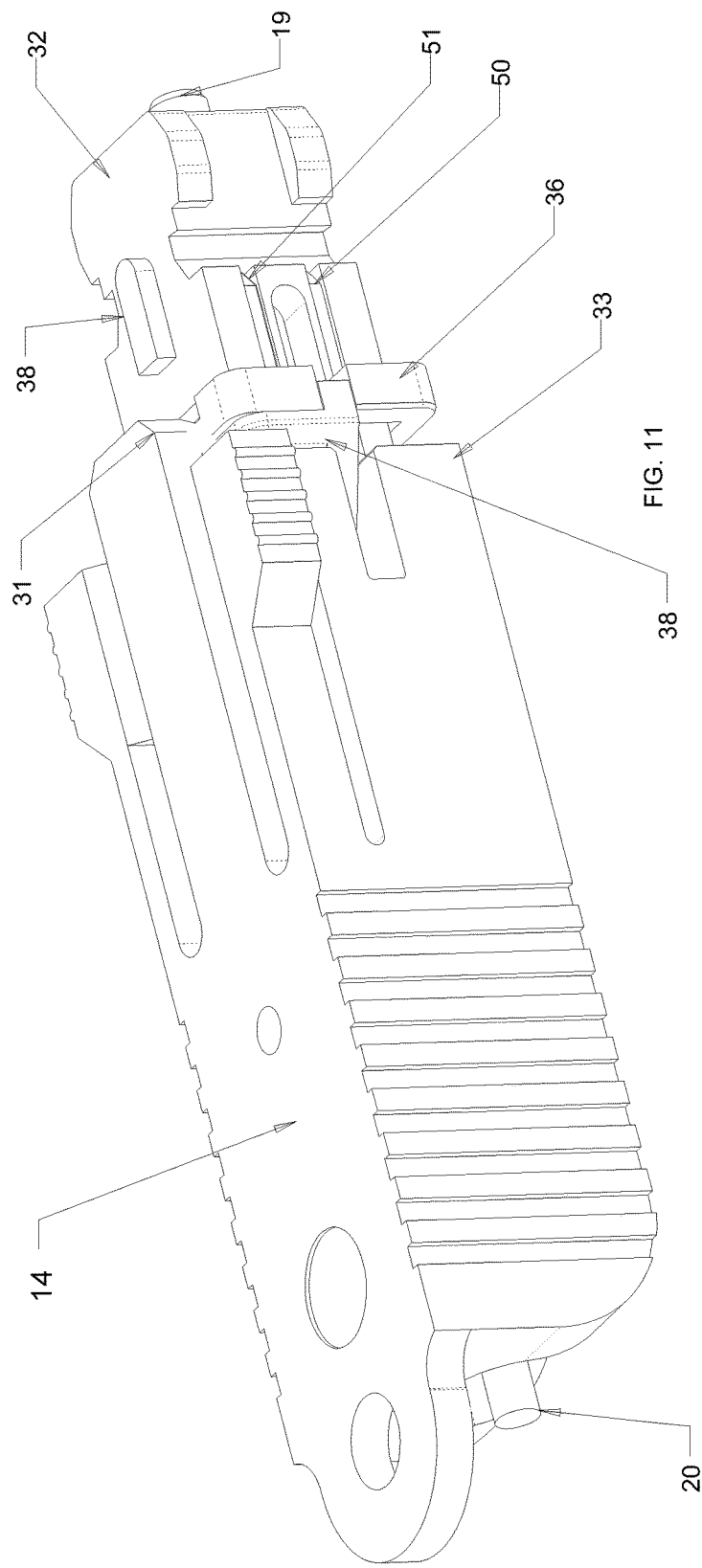
FIG. 11 illustrates a perspective view of a removal tool and an optical plug configured in accordance with the present invention.

FIG. 11 is a perspective view of the removal tool 14 covering the optical plug 10, as it would be during removal of the plug body 32 from an optical receptacle 12. The anti-snag guide 38 and prongs 50 and 51 also are visible.

Figure 12:
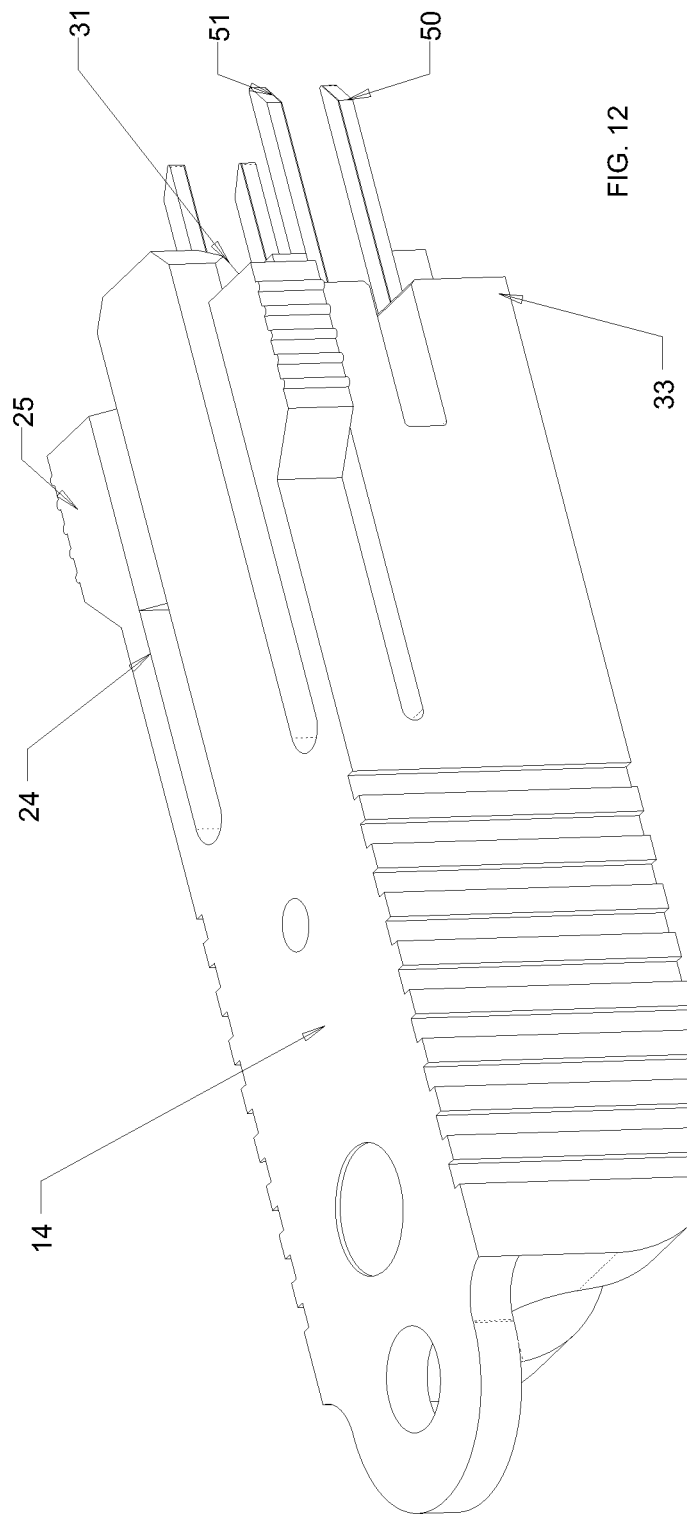
FIG. 12 illustrates a perspective view of a removal tool configured in accordance with the present invention.

FIG. 12 is a perspective view of the removal tool 14. The prongs 50 and 51 of the removal tool 14 are clearly shown.

Figure 13:
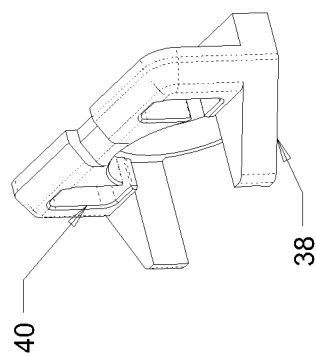
FIG. 13 illustrates a perspective view of an anti-snag guide configured in accordance with the present invention.

FIG. 13 is a perspective view of the anti-snag guide 38 without being attached to the back panel 36 of the optical plug 10.

FIG. 14 is a perspective view of the bung 55 located within the anti-snag guide 38.

While specific embodiments have been shown and described to point out fundamental and novel features of the invention as applied to the preferred embodiments, it will be understood that various omissions and substitutions and changes of the form and details of the invention illustrated and in the operation may be done by those skilled in the art, without departing from the spirit of the invention.

The invention claimed is:

1. An optical fiber connector, comprising:
a body having a front and a back, the body extending in a longitudinal direction between the front and the back of the body;
a back plate connected to the back of the body and extending beyond an outer surface of the body and perpendicular to the longitudinal direction of the body, and the back plate including a plurality of apertures having similar configurations;
said back plate further including a unique aperture having a different configuration from the plurality of apertures on the back plate to form a keyed configuration, thereby requiring a removal tool having prongs matching the keyed configuration to pass through the plurality of apertures and the unique aperture on the back plate;
a boot connected to the back of the body for surrounding an optical fiber cable; and
an anti-snag guide having a guide plate connected to the back plate, wherein the anti-snag guide includes a first ramp passing between an outer surface of the boot and an outer edge of the guide plate.

2. The optical fiber connector of claim 1, further comprising:
a second ramp passing between an outer surface of the boot and the outer edge of the guide plate.

3. The optical fiber connector of claim 1, wherein the guide plate includes apertures aligned and corresponding in shape and size to at least one of the plurality of apertures and the unique aperture on the back plate.

4. The optical fiber connector of claim 1, further comprising:
a removal tool have a plurality of prongs having a cross-sectional configuration corresponding to the plurality of apertures on the back plate;
a unique prong on the removal tool having a different cross-sectional configuration than the plurality of prongs but corresponding to the unique aperture; and
said plurality of prongs are to be inserted into the plurality of apertures and the unique prong is to be inserted into the unique aperture to release the optical fiber connector from an optical receptacle.

5. The optical fiber connector of claim 4, further comprising:
a clip on a front of the removal tool for grabbing an edge of the back plate in order to assist in removing the optical fiber connector from an optical receptacle.

6. The optical fiber connector of claim 4, further comprising:
an arm extension on a front of the removal tool; and
a foot extension on a front of the removal tool extending beyond the arm extension and functioning as a key to properly position the removal tool when contacting the optical fiber connector.

7. The optical fiber connector of claim 1, wherein the guide plate of the anti-snag guide includes apertures for receiving prongs of a removal tool.

8. The optical fiber connector of claim 1, further comprising:
a removal tool have a plurality of prongs having a cross-sectional configuration corresponding to the plurality of apertures on the back of the optical fiber connector;
a unique prong on the removal tool having a different cross-sectional configuration than the plurality of prongs but corresponding to the unique aperture;
said plurality of prongs are to be inserted into the plurality of apertures and the unique prong is to be inserted into the unique aperture to release the optical fiber connector from an optical receptacle;
an arm extension on a front of the removal tool for contacting the guide plate; and
a foot extension on a front of the removal tool extending beyond the arm extension for contacting the back plate; and
wherein the arm extension and the foot extension function as a key to properly position the removal tool when contacting the optical fiber connector.

9. The optical fiber connector of claim 1, wherein the guide plate includes at least one aperture aligned and corresponding in shape and size to one of the plurality of apertures.

10. The optical fiber connector of claim 1, wherein the guide plate includes an aperture aligned and corresponding in shape and size to the unique aperture.

11. The optical fiber connector of claim 1, wherein an external surface of the guide plate is a first color.

12. The optical fiber connector of claim 1, wherein an external surface of the guide plate is a second color.

13. The optical fiber of claim 4, wherein an external surface of the removal tool includes a color similar to a color of an external surface of the guide plate.

14. An optical fiber connector, comprising:
a body having a front and a back, the body extending in a longitudinal direction between the front and the back of the body;
a back plate connected to the back of the body and extending perpendicular to the longitudinal direction of the body, and the back plate including at least one aperture having a first configuration and at least one aperture having a second configuration to form a keyed configuration, thereby requiring a removal tool having prongs matching the keyed configuration to pass through the at least one aperture having a first configuration and the at least one aperture having a second configuration on the back plate;
a boot connected to the back of the body for surrounding an optical fiber cable; and
an anti-snag guide having a guide plate connected to the back plate, wherein the anti-snag guide includes a ramp passing between an outer surface of the boot and an outer edge of the guide plate.

15. The optical fiber connector of claim 14, further comprising:
a removal tool have a plurality of prongs having a cross-sectional configuration corresponding to the at least one aperture having a first configuration and the at least one aperture having a second configuration; and
said plurality of prongs are to be inserted into the at least one aperture having a first configuration and the at least one aperture having a second configuration to release the optical fiber connector from an optical receptacle.

16. The optical fiber connector of claim 14, wherein the guide plate includes at least one aperture having the first configuration and at least one aperture having the second configuration, each aligned and corresponding respectively to shape and size of the at least one aperture of the first configuration and the at least one aperture of the second configuration in the back plate.

17. The optical fiber of claim 15, wherein an external surface of the removal tool includes a color similar to a color of an external surface of the guide plate.

18. An optical fiber connector, comprising:
- a body having a front and a back, the body extending in a longitudinal direction between the front and the back of the body;
- a back plate connected to the back of the body and extending perpendicular to the longitudinal direction of the body, and the back plate including at least one aperture having a first configuration and at least one aperture having a second configuration to form a keyed configuration, thereby requiring a removal tool having prongs matching the keyed configuration to pass through the at least one aperture having a first configuration and at least one aperture having a second configuration on the back plate;
- a bung located within an aperture in the back plate for receiving an optical fiber cable; and
- an anti-snag guide having a guide plate connected to the back plate, wherein the anti-snag guide includes a ramp passing between an outer surface of the bung and an outer edge of the guide plate.

19. The optical fiber connector of claim 18, wherein the guide plate includes at least one aperture having the first configuration and at least one aperture having the second configuration, each aligned and corresponding respectively to shape and size of the at least one aperture of the first configuration and the at least one aperture of the second configuration in the back plate.

20. The optical fiber connector of claim 18, further comprising:
- a removal tool have a plurality of prongs having a cross-sectional configuration corresponding to the at least one aperture having a first configuration and the at least one aperture having a second configuration; and
- said plurality of prongs are to be inserted into the at least one aperture having a first configuration and the at least one aperture having a second configuration to release the optical fiber connector from an optical receptacle; and
- wherein an external surface of the removal tool includes a color similar to a color of an external surface of the guide plate.

* * * * *